Dec. 9, 1930.  W. P. KENT  1,784,489
TEACHING ATTACHMENT FOR PHONOGRAPHS
Filed May 8, 1928
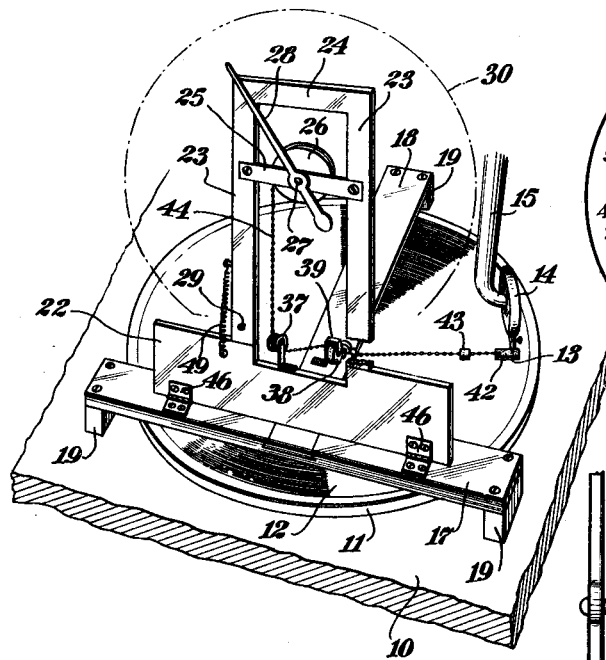
Fig. 1
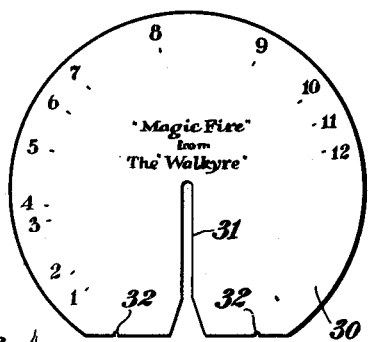
Fig. 2
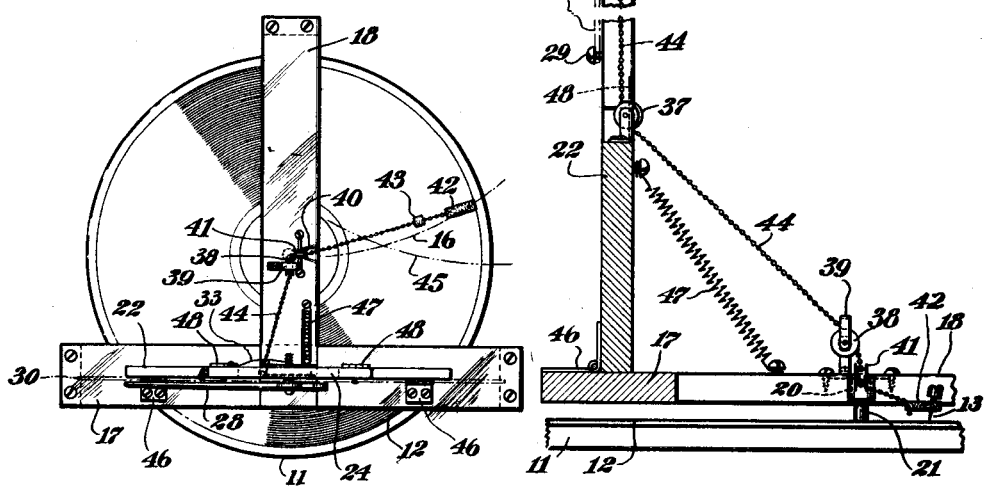
Fig. 3
Fig. 4
INVENTOR
Willys P. Kent,
BY
Friderick Breitenfeld
ATTORNEY Patented Dec. 9, 1930

1,784,489

UNITED STATES PATENT OFFICE

WILLYS P. KENT, OF NEW YORK, N. Y.

TEACHING ATTACHMENT FOR PHONOGRAPHS

Application filed May 8, 1928. Serial No. 275,993.

My present invention relates generally to phonographs, particularly to the character employing disc records; and has particular reference to a teaching attachment or device for translating the subject matter of a record into visible form while the record is being played.

My invention relates generally to the type of device illustrated and described by me in my co-pending patent application filed December 12, 1927, under Serial No. 239,352, patented Dec. 17, 1929, number 1,739,794.

Briefly, the device to which my invention relates comprises a chart element bearing certain indicia relating to the subject matter of the record, a pointer element, means for moving one of said elements relatively to the other, and means for causing such relative movement to occur in timed relationship to the movement of a tone arm or needle which is traversing and playing the record to which the chart element relates.

One object of my present invention is to provide a simplified type of device for accomplishing this general function.

An important object of my invention resides in providing a device which may be usable with equal facility in conjunction with a selected record and a certain chart element relating thereto, regardless of the particular phonograph or reproducing device upon which the record is being played. More particularly, it will be understood, as pointed out in the foregoing application, that phonographs of different makes embody constructions wherein the tone arms and needles thereof traverse differing paths from the periphery of a record to the central portion thereof. Although the actual path of travel may thus be different in one type of phonograph reproducer from that of another type of reproducer, a particular record will be completely played with presumably equal efficiency in each case. Where a common chart is to be provided and employed, it is essential that the mechanism cooperating between the needle travel on the one hand and the relative pointer-chart movement on the other hand must be of a nature to compensate for the differences actually existing between the needle travels.

It is accordingly an object of my present invention to provide a device wherein compensating mechanism of the foregoing character is provided, and more particularly it is an object to provide such mechanism in an extremely simple form.

It is a particular feature of my present invention to provide means for moving the movable pointer or chart element proportionately to the radial component of the needle travel. In this way, the actual needle travel, which in practically all cases digresses from a true radial direction, is rendered powerless to alter the desired relative movement of pointer and chart.

Where I have employed a follower element actuated by the needle or the tone arm during the movement of the latter, a further problem has arisen in connection with the load which such follower element imposes upon the freedom of movement which the needle and tone arm are designed to have. It is an object of my present invention to provide a device of the general character referred to wherein this problem has been obviated and wherein, as a matter of fact, the employment of my device facilitates the freedom of movement of such needle or tone arm.

It is a particular feature of my invention to provide a mechanism which comprises a cable, preferably composed of a very fine type of linked chain. The cable is made to extend from association with the tone arm and needle on the one hand into association with the pointer or chart element on the other.

It is a particular feature of my invention, in accordance with the objects hereinbefore outlined, to provide means for guiding such cable through a point constantly concentric with the record being played. In this way although the actual path of needle travel may be anything but radial, the cable will always have a portion extending in a true radial direction from the needle or tone arm toward the center of the record.

Another feature of my invention lies in providing means, such as a spring, for constantly tensioning said cable or its equivalent in the direction of the center of the record, i. e., in the direction of needle travel. More particularly, it is a feature of my invention to provide the spring in conjunction with the movable pointer or chart element, the spring tending constantly to move said element in the direction desired, and the tone arm or needle being thereby enabled to counteract and restrain the action of the spring in accordance with the true radial component of movement of such tone arm or needle.

Other features of my invention lie in providing the device in a simple and efficient structural manner which facilitates employment thereof with practically any type of phonograph reproducer, which facilitates and simplifies the manufacture and assembly thereof, and which renders the device staunch yet compact, easily transportable, and in some cases totally collapsible into a position overlying the top of a phonograph cabinet.

For the attainment of the foregoing objects and such other objects as may hereinafter appear or be pointed out, I have constructed a device embodying the features of my invention and illustrated in the accompanying drawings, wherein Figure 1 is a perspective view of the main portion of the top of a phonograph reproducer, showing the turntable, a record thereon, a tone arm and needle device, and an attachment constructed in accordance with my present invention associated therewith; the chart being omitted and certain parts being broken away for the sake of clearness;

Figure 2 is a front elevational view of a chart suitable for employment with the device of Figure 1;

Figure 3 is a plan view of the device of Figure 1, all of the tone arm unit except the needle being omitted;

Figure 4 is a cross-sectional view taken from the right of Figure 1.

I have illustrated a supporting board 10 constituting the top board of a cabinet or the like, a turntable 11 being mounted thereon in a wellknown manner. On the turntable 11 I have shown a disc record 12 designed to be played by means of the needle 13 carried by the sound box 14, the latter being associated with a rearwardly extending tone arm 15 or the like. During the traverse of the record, the needle 13 may illustratively travel through a path such as that indicated by the dot and dash line 16 of Figure 3.

In the embodiment illustrated, my device comprises a T-shaped base having a forward portion 17 extending transversely from left to right across the table or support 10, and a central rearwardly extending portion 18. At the end of the portion 18 and at the opposite ends of the portion 17 I contemplate the provision of suitable supports or legs 19, the latter lying outside of the bounds of the turntable 11 and serving to support the portions 17 and 18 slightly above the plane of the record 12.

The portion 18 is provided with an opening 20 or its equivalent for registration with the spindle 21 of the turntable 11. It is to be understood that contact between this spindle and the walls of the opening 20 is not desirable, said opening or its equivalent serving merely to position the device in the proper location.

Mounted upon the forward portion 17 is an upwardly extending wall or support 22, the latter being provided with two spaced upwardly extending supports 23. In the embodiment illustrated, a cross-piece 24 unites the upper ends of the supports 23.

Extending between the supports 23 is a bar 25 in the center of which a drum 26 is journaled, the latter preferably lying to the rear of the bar 25 and substantially between the supports 23. On the forward end of the spindle 27 of the drum 26 I have mounted a pointer 28.

The supports 23 and the cross-piece 24 serve as a back rest or support for a chart such as that illustrated in Figure 2. Any suitable means for mounting the chart may be employed, and I have found it satisfactory to employ the simple expedient of a pair of pins 29 projecting from the lower portions of the supports 23 respectively. The chart 30 may be of the substantially circular configuration illustrated in Figure 2, and when used with the specific device illustrated in Figure 1, it is provided with the radial slot 31 and the two recesses 32 provided in its lower periphery. The chart may be applied by slipping it downwardly between the pointer 28 and the supports 23, the slot 31 riding over the spindle 27 and the recesses 32 finding support upon the pins 29. This positions the chart in substantially the manner indicated by dot and dash lines in Figure 1, the spindle 27 approximately coinciding with the center of the circular chart 30.

Around the periphery of the chart I provide suitable indicia indicated in Figure 2 by the numerals "1-12", this indicia bearing a definite relationship to a particular record and when the invention is employed, the tip of the pointer 28 will travel in a clockwise manner over the indicia to translate into visible form certain matter relating to the record being played.

Any suitable type of spring means is associated with the drum 26 to constantly urge the same in a clockwise direction. I have illustratively shown a spring 33 fixed to the frame 23 at one end 34 and wound around the rear end of the spindle 27 at the other end 35.

A cable or the like, which may be in the form of a very fine chain, extends from a fixed point 36 on the periphery of the drum 26 counter-clockwise around said periphery and thence in a manner presently to be described to a point where it may be attached for movement with the needle 13 or its associated parts.

More particularly, it will be noted that I have provided a pulley 37 in association with the upper edge of the central portion of the supporting wall 22, the axis of the pulley 37 being preferably parallel to the wall 22. On the portion 18, and adjacent to the underlying spindle 21 of the turntable I have provided two additional pulleys one of which, designated by the reference numeral 38, is mounted with its axis parallel to the axis of the pulley 37 and is supported in a suitable strap 39 attached to the portion 18. The other pulley is mounted as low as possible and preferably between the opposite walls of a slot 40 provided in that side of the portion 18 which faces the path of needle travel. This pulley, designated by the reference numeral 41, has its axis extending substantially parallel to the portion 18.

At the free end of the cable I provide a small strip of cork or similar material 42, the latter having an opening therethrough for the passage of the needle 13. It will be understood that this constitutes but one means of associating this end of the cable with the movable elements of the phonograph reproducer. Adjacent to the element 42 and adjustable along the cable is an element 43 whose purpose will be presently described.

The cable 44 extends from the point 36 downwardly around the pulley 37, thence over the top of the pulley 39 and beneath the pulley 41. The latter is so positioned that the direction of the cable extending thence toward the end 42 will be as accurately radial as possible.

When the device is employed, the proper chart 30 is applied in accordance with the particular record being played. Tension is then exerted upon the cable 44 so as to extend the free end thereof into adjacence with the needle 13. Where an element 42 is employed, the needle is passed through a suitably prepared aperture therein before being applied to the edge of the record 12. The device being properly designed, and the chart being properly laid out for use with the particular record on the turntable 11, the pointer 28 will assume a position adjacent to the first indicia on the chart. For example, in the illustrated embodiment, the tip of the pointer 28 may at this initial stage point approximately to the numeral 1 on the periphery of the chart 30.

It will be obvious that the spring 33 is tending constantly to rotate the pointer 28 in a clockwise direction so as to cause it to move over the indicia around the periphery of the chart 30. This action of the spring is serving at the same time to tension the cable 44. More particularly, the free end of the cable is being constantly drawn toward the center of the record. The free end portion of the cable is therefore constrained to assume a radial position.

Counteracting the action of the spring 33 is the normal friction between the needle 13 and the grooves of the record 12. As the latter is rotated, and the needle travels inwardly along the path 16, it permits the spring 33 to wind the cable around the drum 26. At the same time, the pointer is slowly moving over the indicia on the chart. Inasmuch as the cable 44 is always in a radial position, regardless of the particular unradial path of travel 16, the mechanism will truthfully translate the radial component of movement of the needle 13 into exactly proportionate movements of the pointer.

The element 43 when properly positioned will ultimately encounter the end of the slot 40 and prevent further action of the spring 33 in winding the cable upon the drum 26. This encounter between element 43 and slot 40 should be made to occur as the needle 13 reaches the end of the grooved portion of the record, i. e., the inner end of the path of travel 16.

If it is desired to replay any particular portion of the record, it is not necesary to "feel" for the proper desired place. By lifting the needle 13 off the record, and then pulling it radially outwardly until the pointer reaches the particular place on the chart whose repetition is desired, the needle may be replaced at this particular radial position thereof and the desired portion of the record will be at once replayed.

It will be obvious that my device will work with equal facility in conjunction with a particular chart and a particular record, regardless of the particular phonograph reproducer upon which the record is played. Thus, upon reference to Figure 3, the dot and dash line 45 illustrates the possible path of travel of a needle of a different make of phonograph. It will be obvious that the path of travel 45 is not only unradial but is decidedly different and considerably longer than the path of travel 16. Were it not for the compensating features of my transmitting mechanism, the pointer 28 would not move in the selfsame proper manner over the indicia on the chart 30. The constant tensioning of the chain, however, and the mounting thereof which positions the chain always in a radial direction, renders the actual needle travel, whether it be similar to the path 16 or similar to the path 45, utterly powerless to alter the proper and correct travel of the pointer over the chart 30.

It may be pointed out that my present device embodies a minimum of moving parts. It is practically devoid of levers and rods mounted for pivotal movement with respect to one another. Whatever slight friction may be caused by the several pulleys and the travel of the cable over the pulleys, is easily compensated for by proper design of the spring 33. The employment of my device can in no event, therefore, serve as an emcumbrance upon the needle during its play of a record, but may as a matter of fact serve to facilitate the freedom of movement of the needle rather than hinder the same.

For the purpose of rendering the device easily collapsible and transportable, I prefer to hinge the wall 22 to the portion 17 by means of the hinges 46. These hinges 46 permit the wall to be folded forwardly and downwardly over the portion 17; and a spring 47 extending from the portion 18 to the rear surface of the wall 22 serves to retain the latter in its set-up condition. The spring 47 has no effect whatsoever when the wall 22 is completely collapsed.

In a similar manner, I prefer to hinge the upper portion of the device, composed of the supports 23 and the cross-piece 24, as by means of the rearwardly positioned hinges 48. A spring 49 holds the device upright in set-up condition but does not impede the collapsing thereof.

When collapsed, the wall 22 overlies the portion 17 and the upper portion of the device extends rearwardly and overlies the wall 22 and the portion 18. In some cases, I have found it satisfactory to associate the device permanently with a phonograph, and in such an event, the collapsing as above outlined is sufficient to permit a closing of the cover.

I do not mean to limit myself in the appended claims to any particular details of structure, unless the some are specifically referred to. Obviously, the details of construction are a matter of choice and design.

I want to point out particularly that in the device herein illustrated and described, the chart is stationary and the pointer is movable. In some cases, it may be desirable to provide a fixed pointer and means for mounting the chart in a movable manner.

In general, it will be seen that I have provided a device of extreme simplicity, yet one which fulfills its contemplated purpose in a highly efficient manner. The pointer 28 may be made of any desired length, and the chart 30 may be made of correspondingly great size.

Where the term "radial component of movement" has been used herein, and where the same appears in the appended claims, the radial component referred to is that which lies along the radius of the phonograph record or turntable.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. For use with a phonograph disc record and a phonograph reproducer for playing the same, a device comprising a chart element having indicia relating to the subject matter of the record, a pointer element, one of said elements being movable with respect to the other, and means for moving said movable element proportionately to the radial component of movement of the phonograph needle during the needle's traverse of the record, said means comprising a cable extending from the needle to a point over the center of the record and thence to said movable element.

2. For use with a phonograph disc record and a phonograph reproducer for playing the same, a device comprising a chart element having indicia relating to the subject matter of the record, a pointer element, one of said elements being movable with respect to the other, and means for moving said movable element proportionately to the radial component of movement of the phonograph needle during the needle's traverse of the record, said means comprising a cable extending from the needle to a point over the center of the record and thence to said movable element, said means for moving said movable element keeping said cable taut.

3. For use with a phonograph disc record and a phonograph reproducer for playing the same, a device comprising a chart element having indicia relating to the subject matter of the record, a pointer element, one of said elements being movable with respect to the other, means for moving said movable element proportionately to the radial component of movement of the phonograph needle during movement of the phonograph needle during the needle's traverse of the record, said means comprising a cable extending from the needle to a point over the center of the record and thence to said movable element, said means for moving the movable element being a spring constantly tending to move said movable element and keep said cable taut.

4. For use with a phonograph disc record and a phonograph reproducer for playing the same, a device comprising a chart element having indicia relating to the subject matter of the record, a pointer element, one of said elements being movable with respect to the other, and means for moving said movable element proportionately to the radial component of movement of the phonograph needle during the needle's traverse of the record, said means comprising a cable attached at one end to said needle and at the opposite end to said movable element, a pulley for guiding said cable through a point overlying the center of the record, and a spring constantly tending to move said movable element and maintain said cable taut.

5. For use with a phonograph disc record and a phonograph reproducer for playing the same, a device comprising a chart element having indicia relating to the subject matter of the record, a pointer element, one of said elements being movable with respect to the other, and means for moving said movable element proportionately to the radial component of movement of the phonograph needle during the needle's traverse of the record, said means comprising a drum mounted on said movable element, a spring for urging said drum to rotate, and a cable extending from the drum to the needle through a point concentric with the record.

In witness whereof I have signed this specification this 5th day of May, 1928.

WILLYS P. KENT.